:::

United States Patent [19]
Afman et al.

[11] Patent Number: 6,051,264
[45] Date of Patent: Apr. 18, 2000

[54] METHOD OF DRY CURING AND PROCESSING PORK BELLIES TO PROVIDE FULLY COOKED BACON

[75] Inventors: Brent J. Afman, Atlantic, Iowa; Craig L. Stevenson, Bellevue, Nebr.

[73] Assignee: OSI Industries, Inc., Aurora, Ill.

[21] Appl. No.: 09/119,428

[22] Filed: Jul. 20, 1998

Related U.S. Application Data

[63] Continuation-in-part of application No. 08/734,700, Oct. 21, 1996, abandoned, which is a continuation-in-part of application No. 08/437,445, May 4, 1995, Pat. No. 5,567,460.

[51] Int. Cl.[7] .................................................. A23L 1/314
[52] U.S. Cl. ..................... 426/243; 4267/264; 4267/281; 4267/296; 4267/641; 4267/645
[58] Field of Search ..................................... 426/243, 281, 426/264, 296, 641, 645

[56] References Cited

U.S. PATENT DOCUMENTS

| | | |
|---|---|---|
| 2,054,626 | 9/1936 | Griffith . |
| 2,902,369 | 9/1956 | Komarik . |
| 2,974,047 | 3/1961 | Holmes . |
| 3,192,056 | 6/1965 | Williams . |
| 3,370,959 | 2/1968 | Moore et al. . |
| 3,595,679 | 7/1971 | Schoch et al. . |
| 3,674,504 | 7/1972 | Lane . |
| 3,741,777 | 6/1973 | Wrobel et al. . |
| 3,868,468 | 2/1975 | Tompkin et al. . |
| 3,906,115 | 9/1975 | Jeppson . |
| 4,029,824 | 6/1977 | Langen . |
| 4,038,426 | 7/1977 | Jesperson et al. . |
| 4,547,379 | 10/1985 | Moeller et al. . |
| 4,753,809 | 6/1988 | Webb . |
| 4,871,561 | 10/1989 | Parker . |
| 4,879,128 | 11/1989 | Morin et al. . |
| 4,954,356 | 9/1990 | Kappes . |
| 4,957,756 | 9/1990 | Olander et al. . |
| 5,472,722 | 12/1995 | Burger . |

FOREIGN PATENT DOCUMENTS

| | | |
|---|---|---|
| 0 666 030 A1 | 8/1995 | European Pat. Off. . |
| 2716425 | 10/1978 | Germany . |

OTHER PUBLICATIONS

Schiffner, et al., "Die Herstellung von Kochschinken und Formschinken unter bakteriellem Schutz," Fleisch, vol. 36, No. 3, 1982, pp. 53–57 with translation.

Mattson, et al., "Bacon Precooked by Microwaves Offers the Potential of Lowering Nitrosamine Levels," Food Product Development, 1978, p. 47.

Marriott, et al., "Accelerated Dry Curing Of Pork Legs (Hams): A Review," Journal of Muscle Foods, vol. 3, 1992, p. 159–168.

1988 National Association of Meat Purveyors, "The Meat Buyer's Guide," pp. 122, 129 and 154.

*Primary Examiner*—Arthur L. Corbin
*Attorney, Agent, or Firm*—Wallenstein & Wagner, Ltd.

[57] ABSTRACT

Method of curing and processing pork bellies into fully cooked bacon have been developed that eliminates both injection of liquid pickle solution or other liquid marinating processes and the need for smokehouse treatment. The method of the present invention employs a single heating step that both fully cooks a dry cure seasoning coated pork belly and achieves the necessary weight reduction to meet the regulatory product definition for fully cooked bacon.

6 Claims, No Drawings

METHOD OF DRY CURING AND PROCESSING PORK BELLIES TO PROVIDE FULLY COOKED BACON

RELATED APPLICATION

This is a continuation-in-part of U.S. Patent application Ser. No. 08/734,700 filed on Oct. 21, 1996, now abandoned, which is a continuation-in-part of U.S. Ser. No. 08/437,445, filed May 4, 1995, now U.S. Pat. No. 5,567,460 issued on Oct. 22, 1996.

TECHNICAL FIELD

The present invention generally relates to curing and processing pork bellies to produce bacon and, in particular, to a novel method of processing pork bellies into fully cooked bacon without need of smokehouse treatment.

BACKGROUND OF THE INVENTION

The term "bacon" broadly defines a category of cured and processed pork bellies. Most commonly, pork bellies are cured and processed into strip form bacon or circular form. The weight and yield of bacon is precisely defined by federal regulation. For example, for cured pork bellies to be labelled as "uncooked" bacon, the cured pork bellies must have a weight not exceeding the weight of uncured pork bellies. Similarly, for cured pork bellies to be labelled as "cooked" or "precooked" bacon, the cured pork bellies must have a yield not more than 40% the weight of uncured pork bellies, i.e., 60% shrinkage from the initial weight of the pork belly, also known as the "green weight," is required.

The traditional process of curing pork bellies to create a bacon product entails the infusion of a dry cure or liquid pickle solution into the pork bellies. Infusion of the pickle solution creates an infusion weight that exceeds green weight. Depending on manufacturing capabilities and customer preference, infusion weight may be anywhere from 105% to 115% of green weight. To meet the regulatory product definitions of either uncooked or cooked bacon, a degree of weight loss must occur equal to or greater than the added weight of the injected pickle solution, i.e. the finished weight must be equal to or less than the meat portion prior to the injection of the pickle solution. Hence, to obtain the necessary weight reduction to meet the regulatory product definitions for bacon, the prior art has subjected the infused pork bellies to a prolonged low temperature cook cycle.

Historically, this slow cooking took place in smokehouses which achieved the necessary weight reduction and also imparted a smoke flavor characteristic of bacon. Modern techniques employ cooking ovens which heat the product to a core temperature of 140° F. during a 4 to 5 hour cook cycle. This slow, low temperature heating produces a 10%–15% loss of injected weight without reaching temperatures to fully cook the pork bellies. The "smokehouse" treatment cooks-off the liquid portion of the pickle solution leaving behind the seasoning carried in the liquid thus curing the pork bellies and imparting the characteristic bacon taste. After the smokehouse treatment, the cured pork bellies are substantially fluid free.

Because of the use of modern slow cooking ovens, the smoke flavor is now produced in different ways. For circular bacon, created by two individual pork bellies cold formed together and encased within a casing, a smoke flavoring agent is added to the pickle solution. With strip bacon, the entire pork belly may also be subject to an atomized spray of smoke flavoring agent within the cooking chamber of the oven.

For fresh bacon, the "smokehouse" treatment causes adequate weight reduction to return the cured pork belly to green weight and therefore within the regulatory product definition for fresh bacon. After the smokehouse treatment, cured pork bellies intended to be sold as fresh bacon are weighed to assure the necessary loss of 10% weight from infused weight. Next, the internal temperatures of the cured pork bellies are chilled from 140° F. to 30° F. to facilitate slicing. The product is sliced and then packaged.

However, for fully cooked bacon, additional weight reduction of at least another 60% from green weight is necessary to bring the product with the regulatory definition for "cooked" bacon. After completion of the smokehouse treatment, cured pork bellies intended to be sold as cooked are weighed to assure loss of at least 10% weight from infused weight. Whether in circular form or strip form, the internal temperatures of the cured pork bellies are chilled from about 140° F. to 30° F. Again, such chilling is done to facilitate slicing. The bellies are sliced and then further cooked, typically in microwave ovens for about 1½ to 2 minutes depending on microwave amperage, conveyor belt speed through the microwave ovens and, the number of microwave cooking cavities being employed. Such further cooking causes the necessary 60% shrinkage to bring the cured and now fully cooked pork bellies with the regulatory definition for fully cooked bacon.

Hence, curing pork bellies intended as "uncooked" bacon uses single step cooking employing solely the smokehouse treatment while cured pork bellies intended as "fully cooked" bacon uses a two step cooking employing both smokehouse treatment and a second cooking step, typically microwave cooking. The prior art teaches that smokehouse treatment was necessary for curing pork bellies whether they were intended to be sold as fresh or fully cooked bacon.

U.S. Pat. No. 4,957,756 to Olander et al. suggests a method of eliminating smokehouse treatment of pork bellies. However, this method requires a lengthy step of holding the pork belly injected with pickle solution for 32 to 48 hours at temperatures of 48 to 52° F. Olander believes that such holding of the injected pork belly is necessary to achieve adequate dispersal of the pickle solution throughout the pork belly. Such a step greatly increases the costs of producing bacon even though smokehouse treatment has been eliminated.

It is apparent from the above that prior art methods are both time and energy intensive and contribute greatly to the cost of producing bacon. But with the market for fully cooked bacon product gaining in consumer popularity, prior to the development of the present invention, a need existed for methods to cure and process pork bellies into fully cooked bacon by reducing the costs and time associated with a two step cooking cycle and particularly with the smokehouse treatment.

SUMMARY OF THE INVENTION

According to the present invention, a novel method of curing and processing pork bellies into fully cooked bacon has been developed that eliminates both smokehouse treatment and injection of liquid pickle solution into the pork belly. Essentially, the method of the present invention employs a single cooking step that both fully cooks a pork belly coated with a dry cure seasoning, including a smoke flavoring agent, and achieves the necessary weight reduction to meet the regulatory definition for fully cooked bacon. The method of the present invention may be employed for either strip form or circular form bacon.

Generally, the methods of the present invention depart from traditional curing methods by eliminating any infusion into the pork bellies of pickle solution. Because the pork bellies are not injected with a liquid pickle solution, the dry coated pork bellies need not be rapidly chilled to render the pickle solution into a semi-solid as taught in our co-pending application Ser. No. 08/437,445, now U.S. Pat. No. 5,567,460. The dry coated pork bellies need only be sliced prior to cooking.

Further, even though the method of the present invention eliminates both smokehouse treatment and pickle solution injection, only a slightly longer single step cooking is employed. Yet, a more than 60% shrinkage from infused weight results sufficient to meet the regulatory definition for fully cooked bacon. The method of the present invention surprisingly results in fully cooked product having the aroma, flavor, texture and appearance of fully cooked bacon produced by smokehouse treatment, and reduces curing and processing time by an estimated 30–35 hours resulting in dramatic savings.

Other advantages and aspects of the present invention will become apparent from the following detailed description of the invention.

DETAILED DESCRIPTION

While this invention is susceptible of embodiment in many different forms, there is herein described in detail preferred embodiments of the invention with the understanding that the present disclosure is to be considered as an exemplification of the principles of the invention and is not intended to limit the broad aspect of the invention to the embodiments illustrated.

The methods of the present invention are directed to curing and processing pork bellies to produce sliced fully cooked bacon in either strip form or circular form without including the holding step of U.S. Pat. No. 4,957,756. By coating the surfaces of the pork bellies with a dry cure seasoning, including a dry smoke flavor additive, the pork bellies need not be chilled to cold-set the liquid pickle solution retained within infused pork bellies.

The single step cooking cycle employed by the methods of the present invention are generally no more than about 15% longer than second step cooking cycles known in the art for producing fully cooked bacon. Yet, unexpectedly the single step cooking cycle of the present invention results in substantial shrinkage from green weight to produce a fully cooked product meeting the regulatory definition for "cooked" bacon. Further, single step cooking, preferably by microwave or surface conduction cooking such as by heated conveyor belt surfaces, produces a fully cooked bacon product having all of the color, texture, aroma and flavor characteristic of fully cooked bacon. Hence, the method of the present invention eliminates (1) infusion of a liquid pickle solution into the pork bellies, (2) a 32 hour to 42 hour holding period to achieve pickle solution dispersal throughout the pork belly (3) smokehouse treatment, (4) post-smokehouse weighing of product, and, (5) the need to chill smokehouse treated pork bellies from high internal meat temperatures of 140° F. to slicing temperatures of 30° F. The elimination of these steps results in dramatic savings in processing times and costs.

The following Example describes in more detail the method of the present invention with reference to a preferred commercial processing operation for fully cooked bacon.

EXAMPLE

Fully Cooked Sliced Bacon

Pork bellies of a selected weight and size are trimmed in the manner known in the art. As discussed above, the method of the present invention departs from the prior art by eliminating injection of a liquid pickle solution. Instead, a dry cure seasoning having any formulation known in the meat curing art is used. To impart a smoked flavor to the bacon, however, a smoke flavoring agent must be blended into the dry cure seasoning. The pork bellies should be maintained at internal temperatures of 35–40° F. To prepare the pork bellies for coating with the dry cure seasoning, the surface of the pork bellies should be macerated using equipment available from Seffelaar & Looyen, Holland, Mich. This increases the surface area of the pork belly to enhance penetration of the dry cure seasoning.

Next, the dry cure seasoning is added to the macerated pork bellies. This can be accomplished by (1) applying the dry cure seasoning directly to the surface of the pork bellies; (2) adding dry cure seasoning to weighed vats containing pork bellies; or (3) adding dry cure seasoning into a weighed vacuum meat massager. In this latter method, while being tumbled, the pork bellies are dusted with the dry cure seasoning by blowing the composition into the vacuum meat massager. Tumbling continues for a period of 2 to 4 hours at temperatures of about 40° F. Such tumbling also enhances adhesion and bonding together of the pork bellies for producing circular bacon.

The dry coated pork bellies are then further chilled to temperatures of 22 degrees to 30 degrees Fahrenheit prior to slicing. Such chilling causes the fat within the pork belly to be rendered a semi-solid to facilitate product slicing.

After slicing the product into individual pieces of a commercially acceptable thickness, the slices are then immediately transferred to a cooking device. This device may include a conveyor belt having a heat conductive surface (also known as "belt grilling") or, as preferably practiced, by passing the slices on a conveyor belt through one or more microwave cooking chambers. With reference to the preferred commercial operation herein described, a four cavity Ferrite® microwave unit was employed. Each cavity is serviced by two transmitters and each set at maximum amperage setting levels of 4.20. This amperage setting achieves a temperature within each microwave cavity of about 220° F. Conveyor belt speeds had to be decreased from 600 inches/minute for sliced product that was subject to smokehouse treatment, to 550 inches/minute for sliced product processed according to the present invention. Decreased belt speed increased total dwell time within all microwave cooking cavities from approximately 1 minute, 10 seconds to 1 minute, 20 seconds, or about a 15% increase in dwell time.

Sliced product emerging from the microwave cooking chambers possessed the appearance aromas, taste and texture of product processed according to the prior art two step cooking cycle.

By eliminating the steps of (1) injection of liquid pickle solution, (2) smokehouse treatment, (3) post-smokehouse weighing of product, and, (4) the need to chill smokehouse treated pork bellies from internal meat temperatures of 140° F. to slicing temperatures of 30° F., the present invention achieves substantial reductions in cost and processing time for producing fully cooked bacon products. For example by eliminating the 4 to 5 hours necessary for smokehouse treatment, it has been estimated that substantial savings could be achieved in commercial scale production of fully cooked bacon products.

While the specific embodiments have been illustrated and described with reference to a preferred commercial operation, numerous modifications come to mind depending on the variables presented by other commercial operations, all without significantly departing from the spirit and intent of the invention. The scope of protection is only limited by the scope of the accompanying Claims with reference to this specification.

We claim:

1. A method of curing and processing pork bellies to produce fully cooked sliced bacon using a single heat source and omitting any smokehouse treatment of the pork bellies, any injection of liquid pickle solution into the pork bellies and holding of the pork bellies for 32 to 48 hours at 48 to 52° F., comprising the steps of:

providing pork bellies having a preselected weight;

macerating the surface of the pork bellies;

coating the macerated surface of the pork bellies with a dry cure seasoning;

tumbling the coated pork bellies for a time period and at a temperature sufficient to achieve adequate penetration of the dry cure seasoning;

slicing the pork bellies into a plurality of individual slices, heating each slice rapidly with the heat source to a finished weight of no more than 40% of the slice preselected weight; and, continuing heating with the same heat source until the slices are fully cooked.

2. The method of claim 1 wherein the dry cure seasoning includes a flavoring agent for imparting a smoke taste to the pork bellies.

3. The method of claim 1 wherein the steps of heating the slices includes:

passing the slices through a microwave cooking chamber comprising one or more microwave ovens and resulting in a fully cooked product.

4. A method of curing and processing pork bellies to produce fully cooked bacon using a single heat source and omitting both smokehouse treatment and liquid marinating solutions and holding of the pork bellies for 32 to 48 hours at 48 to 52° F., comprising the steps of:

providing pork bellies of a preselected weight;

coating the pork bellies with a dry cure seasoning;

slicing the pork bellies into a plurality of individual slices;

exposing each slice to a heat source to rapidly eliminate at least 60% of the weight of each slice; and cooking the slices using the same heat source until the slices are fully cooked.

5. The method of claim 4 wherein the dry cure seasoning includes a flavoring agent for imparting a smoke taste to the pork bellies.

6. A method of curing and processing pork bellies to produce fully cooked sliced bacon, the improvement comprising omitting any smokehouse treatment, liquid marinating of the pork bellies and holding of the pork bellies for 32 to 48 hours at 48 to 52° F. and comprising the steps of:

dry marinating the pork bellies;

slicing the pork bellies into a plurality of individual slices;

heat reducing each slice with a heating source to a finished weight of no more than 40% of the slice preselected weight; and, continuing heating of the slices with the same heating source until the slices are fully cooked.

* * * * *